United States Patent

Suzuki et al.

[11] Patent Number: 5,812,328
[45] Date of Patent: Sep. 22, 1998

[54] BAYONET MOUNT AND OPTICAL APPARATUS

[75] Inventors: Shinichi Suzuki, Izumi; Toyotoshi Kawasaki, Kawachinagano, both of Japan

[73] Assignee: Minolta Co., Ltd., Osaka, Japan

[21] Appl. No.: 753,862

[22] Filed: Dec. 3, 1996

[30] Foreign Application Priority Data

Dec. 4, 1995 [JP] Japan .................................. 7-315226

[51] Int. Cl.$^6$ ...................................................... G02B 7/02
[52] U.S. Cl. ........................... 359/811; 359/828; 359/819
[58] Field of Search ................................ 359/811, 819, 359/828

[56] References Cited

U.S. PATENT DOCUMENTS 4,737,017  4/1988  Nagasaka ................ 359/819
5,066,103  11/1991  Kodaka et al. ................ 359/819
5,262,899  11/1993  Iizuka .

*Primary Examiner*—Frank G. Font
*Assistant Examiner*—Reginald A. Ratcliff
*Attorney, Agent, or Firm*—McDermott, Will & Emery

[57] ABSTRACT

The surface groove 26c formed in the circumferential direction has a configuration 26x producing a shallow groove. Thus, relative rotation during lens attachment is accomplished without obstruction, and the strength of the bayonet pawls is improved by the enhanced thickness of the center portion by the formation of a gradual angle formation toward the exterior side of cylinder wall 20 from both ends of the surface groove toward the center portion thereof. This type of surface groove configuration 26x is formed at the three surface grooves 26a, 26b, 26c.

18 Claims, 7 Drawing Sheets

BAYONET MOUNT AND OPTICAL APPARATUS

BACKGROUND OF THE INVENTION

1. Field of the Invention

The present invention relates to a bayonet mount and an optical apparatus, and specifically relates to a mount excellent for use as a lens mount and an optical apparatus equipped with the bayonet mount.

2. Description of the Related Art

Conventionally, in camera systems with interchangeable lenses, a bayonet mount is used as the mechanism for attaching and deattaching lenses. Such bayonet mounts have a male side mount, comprising bayonet pawls protruding from the exterior surface of the mount to the exterior side in the radial direction, i.e., intermittently extending in the circumferential direction, and bayonet connector grooves formed in part of the groove wall of said bayonet pawls. Such bayonet mounts have a female side mount provided with bayonet projections protruding from the mount interior surface to the interior side in a radial direction. Both said mounts are connected by inserting the bayonet projections of the female bayonet mount from the lens optical axis direction into insertion spaces formed intermittently between the bayonet pawls of the male bayonet mount, and relatively rotating both said mounts. The connection of the two mounts is completed by the insertion and engagement of the bayonet projections on the female mount into the bayonet connector grooves provided on the male mount.

Such bayonet mounts are generally formed of metal materials, but plastic materials have been used recently. Plastic materials are advantageous inasmuch as they allow the production of bayonet mounts having complex configurations at low cost. On the other hand, plastic generally tends to provide inadequate strength compared to metal. Increasing the thickness of the various parts of the mount has been considered as a measure to improve strength, but simply increasing the thickness also increases the size of the mount itself and is an impractical solution.

Integratedly forming a bridge at the tip position of one end of the bayonet pawls formed in the circumferential direction particularly improves the load strength of the bayonet tip. Although the strength is improved because the bridge receives the load in the circumferential direction via the aforesaid construction, the strength improvement is inadequate in other directions, and particularly relative to the load in the radial direction.

SUMMARY OF THE INVENTION

An object of the present invention is to provide a bayonet mount and an optical apparatus equipped with the bayonet mount with improved bayonet strength particularly relative to loads in the radial direction without enlargement of the mount.

Another object of the present invention is to provide a bayonet mount and an optical apparatus equipped with the bayonet mount having a construction which ensures effective strength with minimum material without enlargement of the mount.

These objects are achieved by the construction of the present invention which provides a bayonet mount and an optical apparatus equipped with the bayonet mount with a bayonet connector groove and a bayonet pawl on the exterior cylinder wall surface, wherein cylinder wall is integratedly formed with thick areas projecting from the cylinder wall interior surface to the interior side radial direction, i.e., extending in a radial direction.

BRIEF DESCRIPTION OF THE DRAWINGS

These and other objects and features of this invention will become clear from the following description, taken in conjunction with the preferred embodiments with reference to the accompanied drawings in which.

DETAILED DESCRIPTION OF THE PREFERRED EMBODIMENTS

The aforesaid embodiments of the bayonet mount of the present invention are described hereinafter with reference to FIGS. 1 through 7.

The mount 10 is a male bayonet mount formed of plastic and used as the interchangeable lens of a camera, the construction broadly comprising a mounting flange 12 and a cylinder wall 20.

Figure 1:
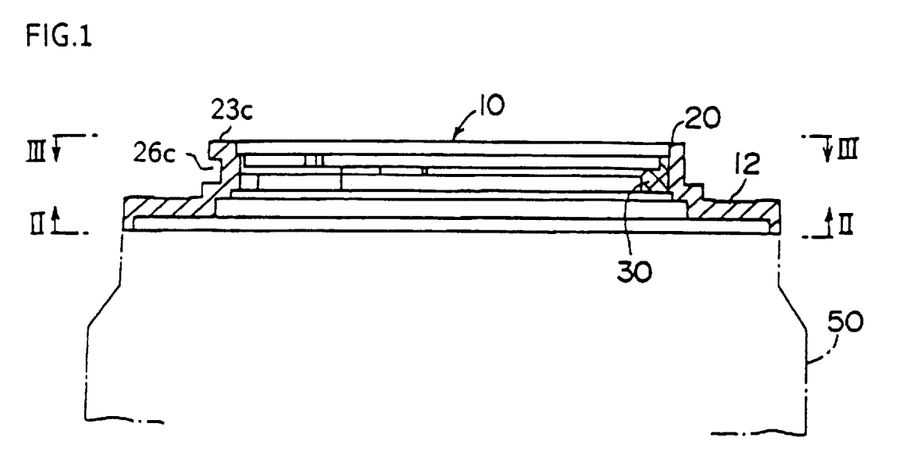
FIG. 1 is a section view of an embodiment of the bayonet mount and the optical apparatus of the present invention.
Figure 2:
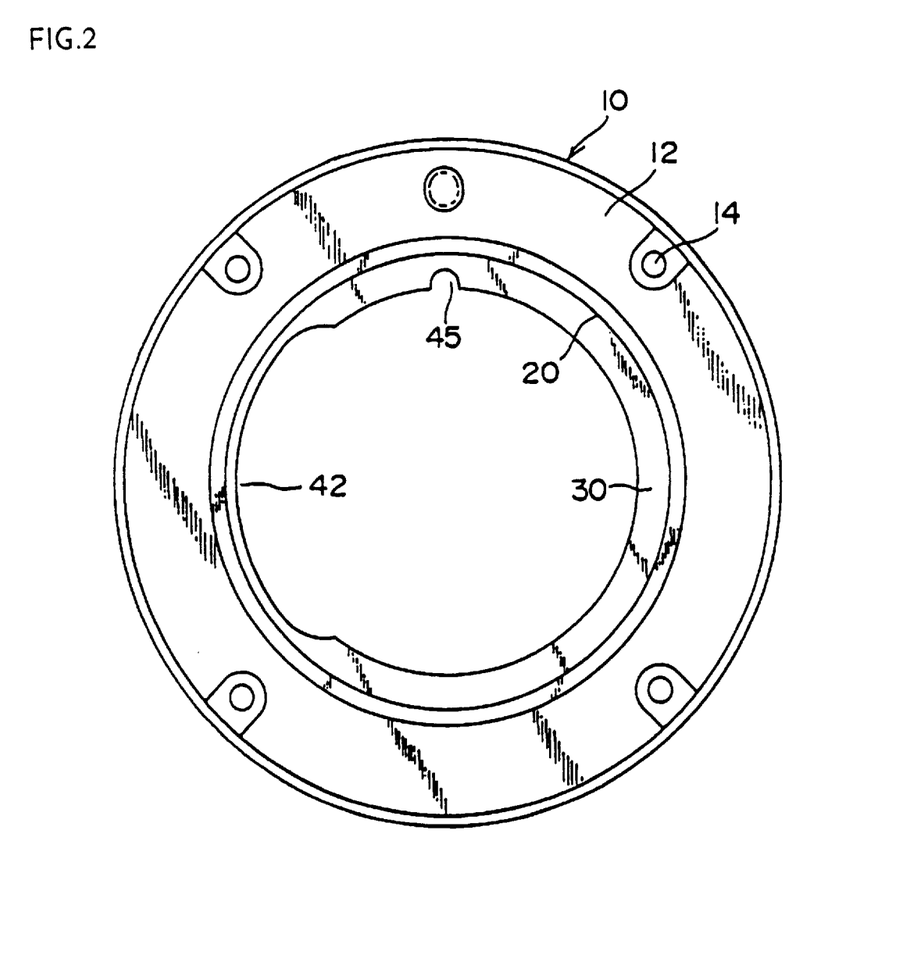
FIG. 2 is a bottom view of the bayonet mount of the embodiment shown in FIG. 1 as viewed from the II—II side.

The mounting flange 12 extends from the edge at one end of the cylinder wall 20 toward the exterior of the cylinder. Mounting flange 12 is provided with four machine screw mounting holes 14 as shown in FIGS. 2 and 3, such that mounting flange 12 and lens barrel 50 are fixedly attached via mounting machine screws (not shown in the drawings).

Figure 3:
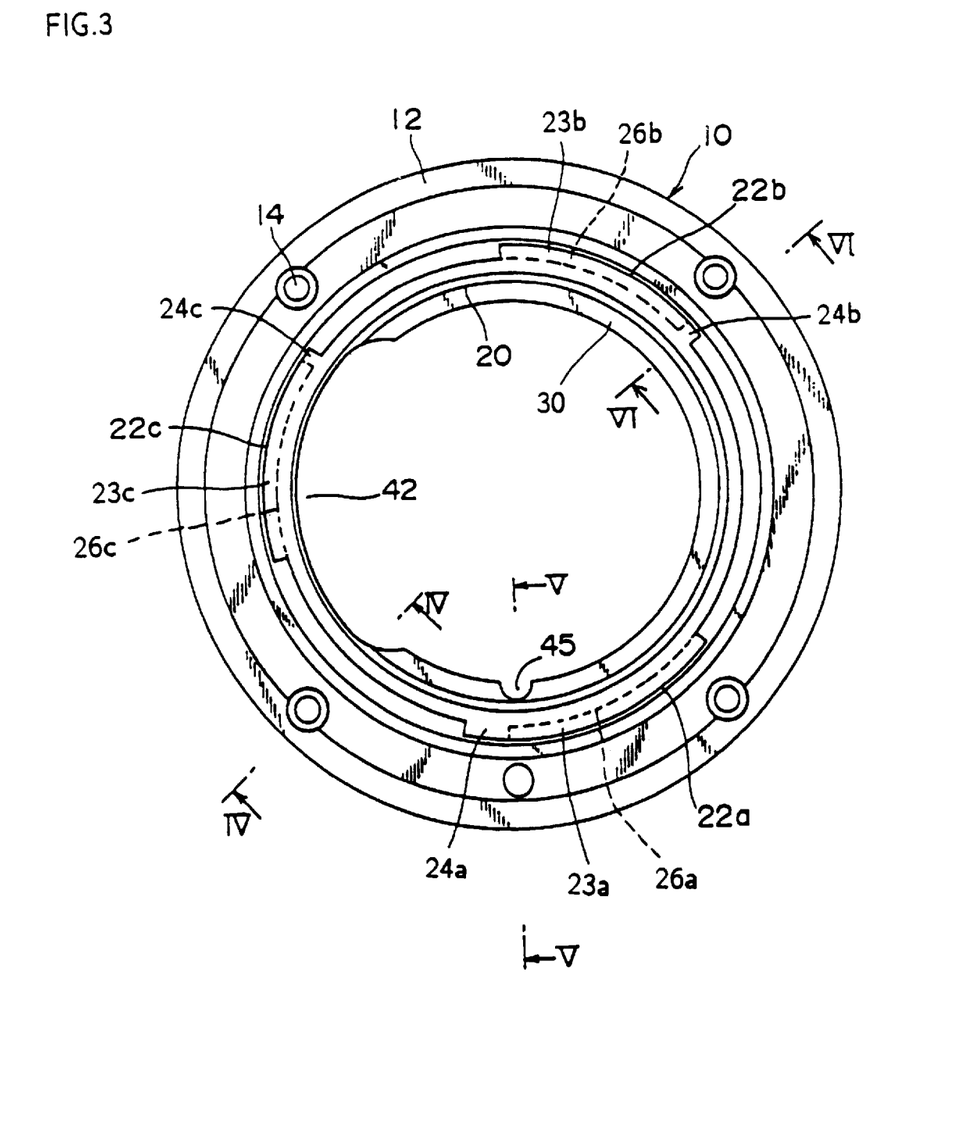
FIG. 3 is a bottom view of the bayonet mount of the embodiment shown in FIG. 1 as viewed from the III—III side.
Figure 4:
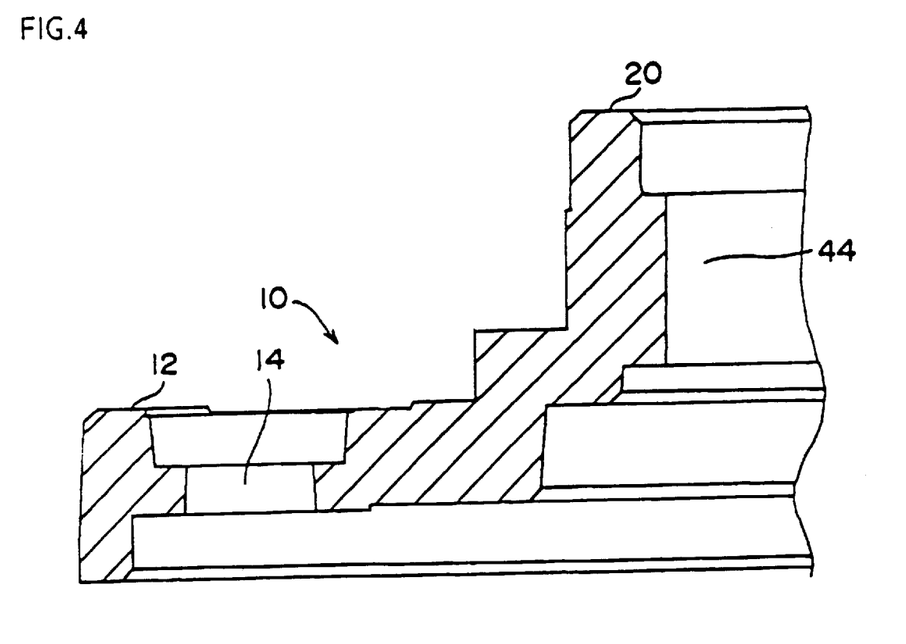
FIG. 4 is an enlarged section view cut along the IV—IV line of FIG. 3.
Figure 5:
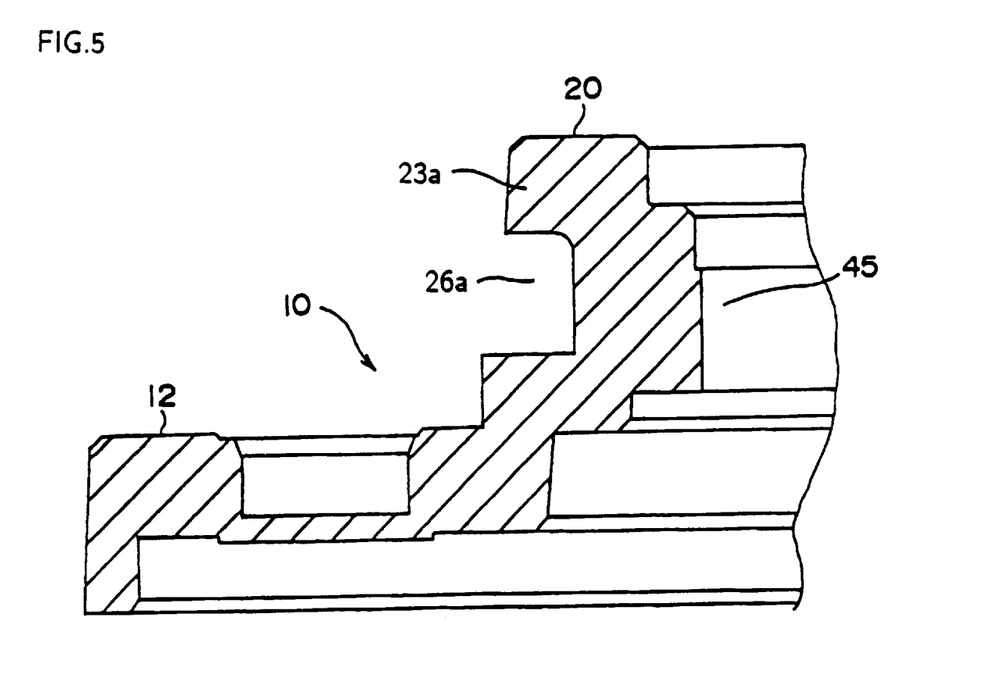
FIG. 5 is an enlarged section view cut along the V—V line of FIG. 3.

Bayonet portions 22a, 22b, 22c are formed at three locations on the exterior surface of cylinder wall 20, as shown in FIG. 3. That is, bayonet pawls 23a, 23b, 23c are provided on the edge of the opposite side relative to the side on which the mounting flange 20 is formed on cylinder wall 20 and disposed within a predetermined range in the circumferential direction so as to protrude in a radial direction to the exterior side. Surface grooves 26a, 26b, 26c are formed between the mounting flange 12 and the bayonet pawls 23a, 23b, 23c on the cylinder wall 20. One end of each of the bayonet pawls 23a, 23b, 23c, and surface grooves 26a, 26b, 26c are provided with a stopper 24a, 24b, 24c formed at one end of the circumferential grooves 26a, 26b, 26c and bayonet pawls 23a, 23b, 23c so as to connect mounting flange 12 and bayonet pawls 23a, 23b, 23c.

Figure 6:
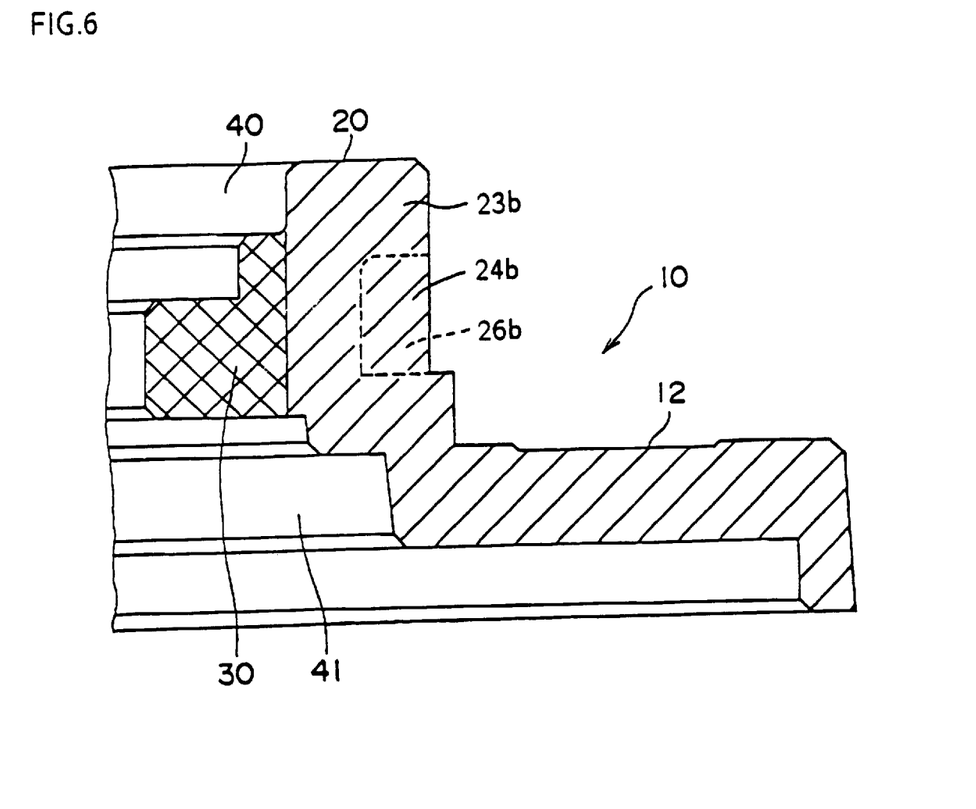
FIG. 6 is an enlarged section view cut along the VI—VI line of FIG. 3.

A thickened portion 30 extending in the radial direction is integratedly formed on the interior surface of cylinder wall 20. Although thickened portion 30 desirably extends continuously in the circumferential direction corresponding to surface grooves 26a, 26b, 26c of the bayonet, a notch 42 is provided locally without said thickened portion 30 as shown in FIG. 3, to avoid touching the signal pins protruding on the camera body. In the present embodiment, notch 42 is positioned to correspond to bayonet portion 22c. Furthermore, thickened portion 30 is not formed entirely in the lens optical axis direction of cylinder wall 20, as shown in FIG. 6. According to FIG. 6, the thickened portion 30 is not formed on top section 40 and bottom section 41. That is, thickened portion 30 does not simply increase the thickness of the entire cylinder wall 20 so as to reduce the interior diameter of said cylinder wall 20, but rather effectively assures the strength at necessary locations with minimum material.

The four machine screw holes 14 formed in mounting flange 12 are provided at positions separated as far as possible from bayonet portion 22c. That is, mounting machine screw holes 14 are provided at positions separated as far as possible from bayonet portion 22c to assure the strength of bayonet portion 22c which is positioned near the notch 42 of thickened portion 30.

In the aforesaid construction, strength is improved mainly relative to force applied in a radial direction because the thickness of cylinder wall 20 corresponding to surface groove 26a and 26b of bayonet portions 22a and 22b is thickened on most of the circumferential interior side radial direction via thickened portion 30. Furthermore, enlarging the mount 10 can be avoided via the aforesaid thickening off the interior side in a radial direction, thereby assuring strength without increasing the size of the lens barrel.

Since the thickened portion is notched so as to produce no oscillation of the mount 10 or signal pins and the like on the camera body side when an interchangeable lens is attached to the camera body, it is possible to avoid damaging the mount 10 and wearing of the signal pins.

The bayonet pawls 23a, 23b, 23c can be strengthened in the optical axis direction and the impact load exerted on the stopper of each bayonet portion can be dispersed when the lens attachment to the camera body is completed by providing the three bayonet portions 22a, 22b, 22c and stoppers 24a, 24b, 24c formed on said respective bayonet portions. The stress generated by machine screw holes 14 formed in mounting flange 12 influences the strength of each bayonet portion. This influence of the machine screw holes 14, however, is exerted on the edges of the high-strength bayonet portions 22a and 22b, and is not exerted on the edge of the low-strength bayonet portion 22c because said machine screw holes 14 are formed so as to avoid said bayonet portion 22c positioned near the notch 42 of thickened portion 30. Accordingly, the strength of bayonet portions 22a, 22b, and 22c is improved overall.

Figure 7:
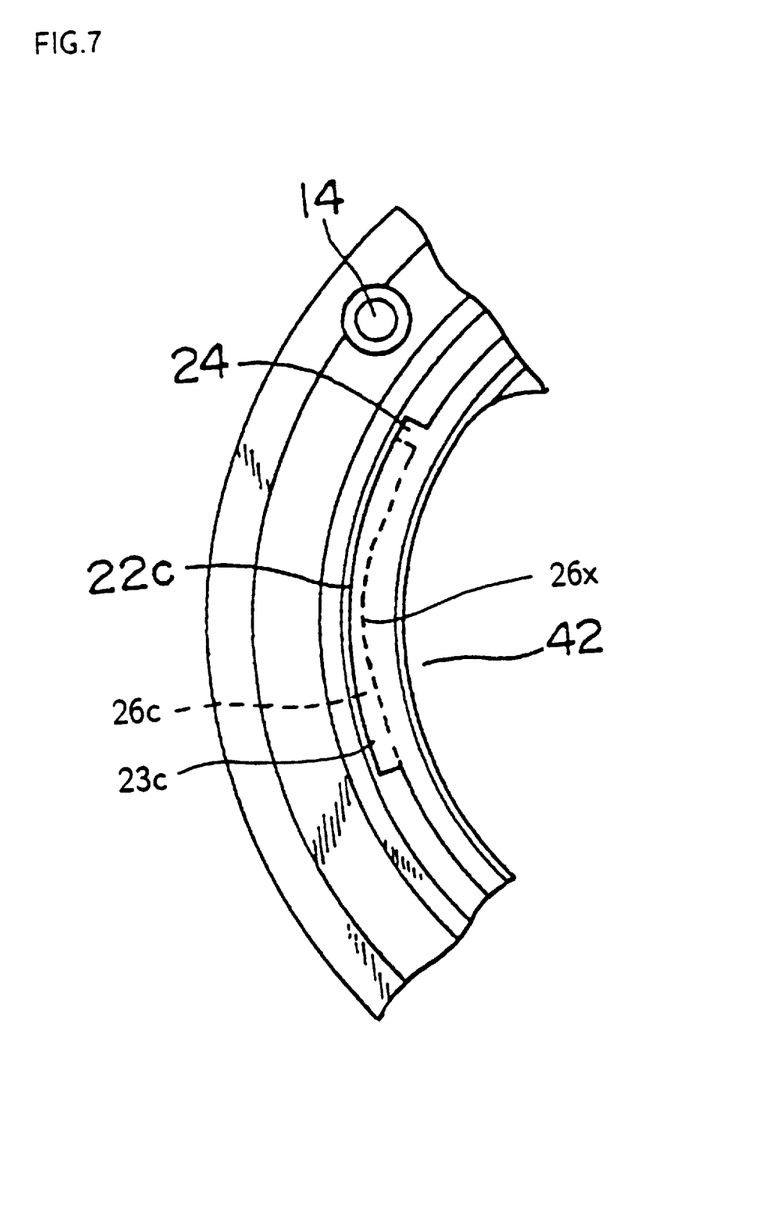
FIG. 7 is an enlargement of the essential portion illustration the configuration of the circumferential groove.

In the embodiment shown in FIG. 7, the surface groove 26c formed in the circumferential direction has a configuration 26x producing a shallow groove. In the drawing, the configuration is exaggerated to facilitate understanding. Thus, relative rotation during lens attachment is accomplished without obstruction, and the strength of the bayonet pawls is improved by the enhanced thickness of the center portion by the formation of a gradual angle formation toward the exterior side of cylinder wall 20 from both ends of the surface groove toward the center portion thereof. This type of surface groove configuration 26x is formed at the three surface grooves 26a, 26b, 26c.

The present invention is not limited to the previously described embodiments, inasmuch as various other modes and embodiments are possible. For example, although the previously mentioned mount 10 has been described as mounting on the lens side with a suitable bayonet structure on the interior side, the aforesaid construction can be adapted to an exterior side bayonet structure with the mounting on the camera body side.

Obviously, many modifications and variation of the present invention are possible in light of the above teachings. It is therefore to be understood that within the scope of the appended claims, the invention may be practiced other than as specifically described.

What is claimed is:

1. A bayonet mount used as a mechanism for attaching and deattaching optical apparatus, comprising:
   a cylinder wall which has a bayonet groove and a bayonet pawl on exterior surface thereof;
   wherein the cylinder wall is integratedly formed with a thick area projecting from the cylinder wall interior surface to the interior side radial direction.

2. A bayonet mount as claimed in claim 1, wherein said bayonet mount is made of plastic.

3. A bayonet mount as claimed in claim 1, wherein said cylinder wall has a stopper which projects in exterior direction on one end of said bayonet groove.

4. A bayonet mount as claimed in claim 1, wherein said bayonet groove is enhanced in thickness on the center portion thereof.

5. A bayonet mount as claimed in claim 1, wherein said cylinder wall have a plurality of said bayonet grooves and said bayonet pawls.

6. A bayonet mount as claimed in claim 5, wherein said cylinder wall has stoppers which project in exterior direction on one end of said bayonet groove respectively.

7. A bayonet mount as claimed in claim 1, wherein said bayonet grooves are enhanced in thickness on the center portion thereof respectively.

8. A bayonet mount used as a mechanism for attaching and deattaching optical apparatus, comprising:
   a cylinder wall which has a bayonet portion including a bayonet groove and a bayonet pawl on a surface thereof;
   wherein the cylinder wall is integratedly formed with a thick area projecting from the cylinder wall to a radial direction and extending in a circumferential direction.

9. A bayonet mount as claimed in claim 8, wherein said bayonet mount is made of plastic.

10. A bayonet mount as claimed in claim 8, wherein said cylinder wall is formed with a notch locally without said thick area.

11. A bayonet mount as claimed in claim 10, further comprising a flange which extends from an edge at one end of said cylinder wall toward the exterior of the cylinder and which has a screw hole at a position as far as possible away from said notch.

12. A bayonet mount as claimed in claim 8, wherein said thick area is formed partially in an axis direction of said cylinder wall.

13. A bayonet mount as claimed in claim 8, wherein said cylinder wall has a stopper which projects on one end of said bayonet groove.

14. A bayonet mount as claimed in claim 8, wherein said bayonet groove is enhanced in thickness on the center portion thereof.

15. An optical apparatus equipped with a bayonet mount attachable and deattachable to another apparatus, comprising:

a body of said optical apparatus; and a bayonet mount which is mounted on said body and which has a bayonet groove and a bayonet pawl on exterior surface thereof;

wherein said bayonet mount is integratedly formed with a thick area projecting from the bayonet mount interior surface to the interior side radial direction.

16. An optical apparatus as claimed in claim 15, wherein said bayonet mount is made of plastic.

17. An optical apparatus as claimed in claim 15, wherein said bayonet mount has a stopper which projects in exterior direction on one end of said bayonet groove.

18. An optical apparatus as claimed in claim 15, wherein said bayonet groove is enhanced in thickness on the center portion thereof.

* * * * *